United States Patent
Hiei et al.

(10) Patent No.: US 11,518,370 B2
(45) Date of Patent: Dec. 6, 2022

(54) PARKING ASSISTANCE APPARATUS

(71) Applicant: TOYOTA JIDOSHA KABUSHIKI KAISHA, Toyota (JP)

(72) Inventors: Yu Hiei, Toyota (JP); Daiki Maruki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 17/064,859

(22) Filed: Oct. 7, 2020

(65) Prior Publication Data

US 2021/0107466 A1 Apr. 15, 2021

(30) Foreign Application Priority Data

Oct. 11, 2019 (JP) .............................. JP2019-187462

(51) Int. Cl.
  *B60W 30/06* (2006.01)
  *B60W 30/095* (2012.01)
  *B60W 40/114* (2012.01)

(52) U.S. Cl.
  CPC ........ *B60W 30/06* (2013.01); *B60W 30/0956* (2013.01); *B60W 40/114* (2013.01); *B60W 2420/50* (2013.01); *B60W 2554/80* (2020.02)

(58) Field of Classification Search
  None
  See application file for complete search history.

(56) References Cited

U.S. PATENT DOCUMENTS

| 9,522,661 | B2 | 12/2016 | Inoue et al. |
| 9,604,638 | B2 | 3/2017 | Kiyokawa et al. |
| 9,738,276 | B2 | 8/2017 | Kiyokawa et al. |
| 9,802,588 | B2 | 10/2017 | Inoue et al. |
| 9,828,028 | B2 | 11/2017 | Ishijima et al. |
| 9,836,658 | B2 | 12/2017 | Kiyokawa et al. |
| 9,875,655 | B2 | 1/2018 | Kiyokawa et al. |
| 10,031,227 | B2 | 7/2018 | Kiyokawa et al. |
| 10,150,486 | B2 | 12/2018 | Hoshino et al. |
| 10,239,520 | B2 | 3/2019 | Tomozawa et al. |
| 10,377,416 | B2 | 8/2019 | Fukukawa et al. |

(Continued)

FOREIGN PATENT DOCUMENTS

| EP | 3 124 360 A1 | 2/2017 |
| JP | 2004-338636 A | 12/2014 |

*Primary Examiner* — Aniss Chad
*Assistant Examiner* — Jennifer M Anda
(74) *Attorney, Agent, or Firm* — Sughrue Mion, PLLC

(57) ABSTRACT

A parking assistance apparatus obtains a target travelling route including a forward section and a backward section and lets a vehicle move along the target travelling route such that the vehicle reaches a target parking position. The parking assistance apparatus execute a collision avoidance processing when an obstacle which is closer than a threshold distance is detected while the vehicle moves along the target travelling route. The distance between the vehicle and a specific region is kept to be larger than a clearance distance while the vehicle moves along the backward section such that the obstacle for the collision avoidance processing which cannot be detected while the vehicle moves along the forward section will not be found while the vehicle moves along the backward section. The specific region is determined on the basis of a detection region of a sensor device for detecting the obstacle and the threshold distance.

3 Claims, 7 Drawing Sheets

(56) References Cited

U.S. PATENT DOCUMENTS

| | | |
|---|---|---|
| 10,494,025 B2 | 12/2019 | Nakamura |
| 11,180,135 B2 * | 11/2021 | Kim .................. G01C 21/3611 |
| 2015/0367845 A1 * | 12/2015 | Sannodo ............... B60W 10/20 |
| | | 701/23 |
| 2017/0028914 A1 * | 2/2017 | Kiyokawa .......... B62D 15/0285 |
| 2020/0398829 A1 * | 12/2020 | Kasai .................... B60K 35/00 |
| 2021/0291814 A1 * | 9/2021 | Shirozono ............. B60W 50/14 |

* cited by examiner

PARKING ASSISTANCE APPARATUS

TECHNICAL FIELD

The present disclosure relates to a parking assistance apparatus configured to execute parking assistance processing to assist a vehicle to move to a target parking position.

BACKGROUND

A conventionally known parking assistance apparatus (hereinafter also referred to as the "conventional apparatus") obtains (determines) a "target travelling route (path)" from a present (current) position of a vehicle to the target parking position, and further makes (lets) the vehicle automatically travel (move) along/on the target travelling route. In order to obtain the target travelling route, the conventional apparatus obtains, as a provisional target position, a position closer to the present position of the vehicle by a predetermined distance in a predetermined direction from the target parking position, and then, obtains the target travelling route such that that target travelling route passes through the provisional target position.

In addition, when an actual travelling route deviates from the target travelling route, the conventional apparatus newly obtains the target travelling route from the present position of the vehicle at that time. In this case, if a distance from the present position to the target parking position is smaller than a predetermined threshold, the conventional apparatus obtains the target travelling route such the vehicle reaches the target parking position without passing through the provisional target position.

According to the conventional apparatus, even if the actual travelling route of the vehicle deviates from the target travelling route, a possibility that the conventional apparatus succeeds to obtain the new target travelling route is relatively high (see, for example, Japanese Patent Application Laid-Open (kokai) No. 2004-338636).

SUMMARY

For example, the target travelling route is sometimes obtained such that the vehicle travels (moves) backward to reach the target parking position (namely, the vehicle backs to reach the target parking position). Hereinafter, a "section (segment of a route) included in the entire target travelling route" along which the vehicle travels/moves backward to reach the target parking position is referred to as a "backward section." If it is impossible to obtain the backward section to the target parking position from the present position of the vehicle, another section (hereinafter referred to as a "forward section") of a route along which the vehicle travels/moves forward to reach a start point of a backward section to the target parking position is obtained. Hereinafter, a position which is an end point of the forward section that is the start point of the backward section is referred to as a "reverse (or turning) position."

When an object with which the vehicle is highly likely to collide (namely, an obstacle) is detected while the vehicle is moving along the backward section, it is necessary to stop the vehicle (or to interrupt/terminate the travel/movement of the vehicle) and to obtain a new target travelling route along which the vehicle can move without colliding with the obstacle. Hereinafter, interrupting the travel due to detecting an obstacle during the travel along the backward section and obtaining the new target travelling route is also referred to as "assist interruption."

For example, when the assist interruption occurs, the vehicle returns to the reverse position by travelling forward, and then travels along the newly obtained target travelling route. As a result, a route along which the vehicle travels from a start of the parking assistance processing to an arrival of the vehicle at the target parking position in a case where the assist interruption occurs becomes more complex, as compared with a case where the assist interruption does not occur. In addition, it may be difficult to obtain the new target travelling route along which the vehicle can travel to the target parking position without colliding with the obstacle from a position of the vehicle at a point in time when the assist interruption occurs.

However, according to the conventional apparatus, no consideration is given to avoiding occurrence of the assist interruption.

In view of the forgoing, one object of the present disclosure is to disclose a parking assistance apparatus that can reduce a possibility that the assist interruption occurs when the parking assistance processing is being executed.

A parking assistance apparatus for achieving the above-described object (hereinafter also referred to as "the apparatus of the present disclosure") comprises an object detection sensor device, and a control unit. The control unit may be implemented by at least one programmed processor whose operation is determined by a predetermined program, gate arrays and the like.

The object detection sensor device is configured to detect an object that is present in a predetermined detection region with respect to a vehicle. The detection region includes at least a part of a side area of the vehicle.

The control unit is configured to obtain a "target travelling route" from a present position of the vehicle to a "target parking position." In addition, the control unit is configured to execute a "travelling assistance processing" for controlling at least a steering angle of the vehicle such that the vehicle moves along the target travelling route.

Furthermore, the control unit is configured to execute a predetermined "collision avoidance processing" when an object regarded as an obstacle is detected by the object detection sensor device while the travelling assistance processing is being executed, wherein a distance between the object regarded as the obstacle and the vehicle is smaller than a predetermined threshold distance.

In addition, the control unit is configured to obtain the target travelling route such that the target travelling route includes a backward section and a forward section, and a minimum value of a distance between the vehicle and a specific region is larger than a predetermined clearance distance while the vehicle moves along the backward section.

The backward section is a section along which the vehicle is made to move backward to reach the target parking position. The forward section is a section along which the vehicle is made to move forward to reach a reverse position that is a start point of the backward section.

The specific region is a region on a specific direction side of a specific line with respect to the vehicle located at the target parking position and on the specific direction side of a sum set region with respect to the vehicle while the vehicle is moving along the forward section.

The specific direction is one of a right direction and a left direction and is a direction in which the target parking position is present with respect to the vehicle located at the present position. The specific line is a straight line which is parallel to a longitudinal direction of the vehicle located at the target parking position and is on the specific direction side with respect to the vehicle located at the target parking position, wherein a distance between the specific line and the vehicle located at the target parking position is equal to the threshold distance.

The sum set region is a set of the detection regions, each being present on the specific direction side of the vehicle while the vehicle moves along the forward section.

If the object is present in the sum set region, that object can be detected by the object detection sensor device while the vehicle moves along the forward section. Meanwhile, if the object is present in the specific region, that object cannot be detected while the vehicle moves along the forward section. In view of this, the apparatus of the present disclosure obtains (determines) the backward section such that the distance from the backward section to the specific region is kept smaller than the clearance distance while the vehicle moves along the backward section.

For example, the clearance distance may be a value equal to the threshold distance, or may be "0." If the clearance distance is set at "0," the apparatus of the present disclosure obtains the backward section such that the vehicle does not enter the specific region while the vehicle moves along the backward section (namely, a part of or all of the vehicle does not overlap with the specific region while the vehicle moves along the backward section). If the clearance distance is larger than "0," a distance from the specific region to the vehicle during the travel along the backward section does not become smaller than the clearance distance. Accordingly, a possibility that the collision avoidance processing is executed for the object that is present in the specific region while the vehicle moves along the backward section is reduced. Therefore, according to the apparatus of the present disclosure, the possibility that the assist interruption occurs can be reduced.

In one aspect of the apparatus of the present disclosure, the object detection sensor device is configured such that the detection region extends laterally from the vehicle to a position that is a predetermined detection distance laterally away from the vehicle.

In addition, the control unit is configured to obtain the target travelling route such that a "yaw angle differential" does not increase while the vehicle moves along the forward section, the yaw angle differential does not increase while the vehicle moves along the backward section; and a minimum value of a distance between the vehicle and an intersection point between the specific line and a reference line is larger than the clearance distance while the vehicle moves along the backward section.

The yaw angle differential is a magnitude of difference between a yaw angle of the vehicle and the yaw angle of the vehicle located at the target parking position. The reference line is a straight line which is parallel to the longitudinal direction of the vehicle located at the present position and is on the specific direction side of the vehicle located at the present position, wherein a distance between the reference line and the vehicle located at the present position is equal to the detection distance.

According to the present aspect, each of the forward section and the backward section is a straight line or a curved line along which the vehicle turns in only one direction when the vehicle travels (i.e., neither the forward section nor the backward section has an inflection point). Namely, in the present aspect, while the vehicle moves along each of the forward section and the backward section, the vehicle does not make both a right turn and a left turn.

In this case, the minimum value of the distance (namely, intersection distance) between the vehicle and the intersection point while the vehicle moves along the backward section becomes equal to the minimum value of the distance between the vehicle and the specific region while the vehicle moves along the backward section. Therefore, according to the present aspect, it is possible to obtain the backward section by a relatively simple process on the basis of (using) the intersection point.

Furthermore, in another aspect of the apparatus of the present disclosure, the object detection sensor device is mounted on a vehicle body of the vehicle and comprises a transmission section which transmits an electromagnetic wave or a sonic wave as a transmission wave to the side of the vehicle; and a reception section which receives a reflection wave generated by reflection of the transmission wave at the object present in the detection region.

According to the present aspect, even if the object is present on the side of the vehicle, it is possible to obtain a position of that object with relatively high accuracy.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DETAILED DESCRIPTION (Configuration)

Figure 1:
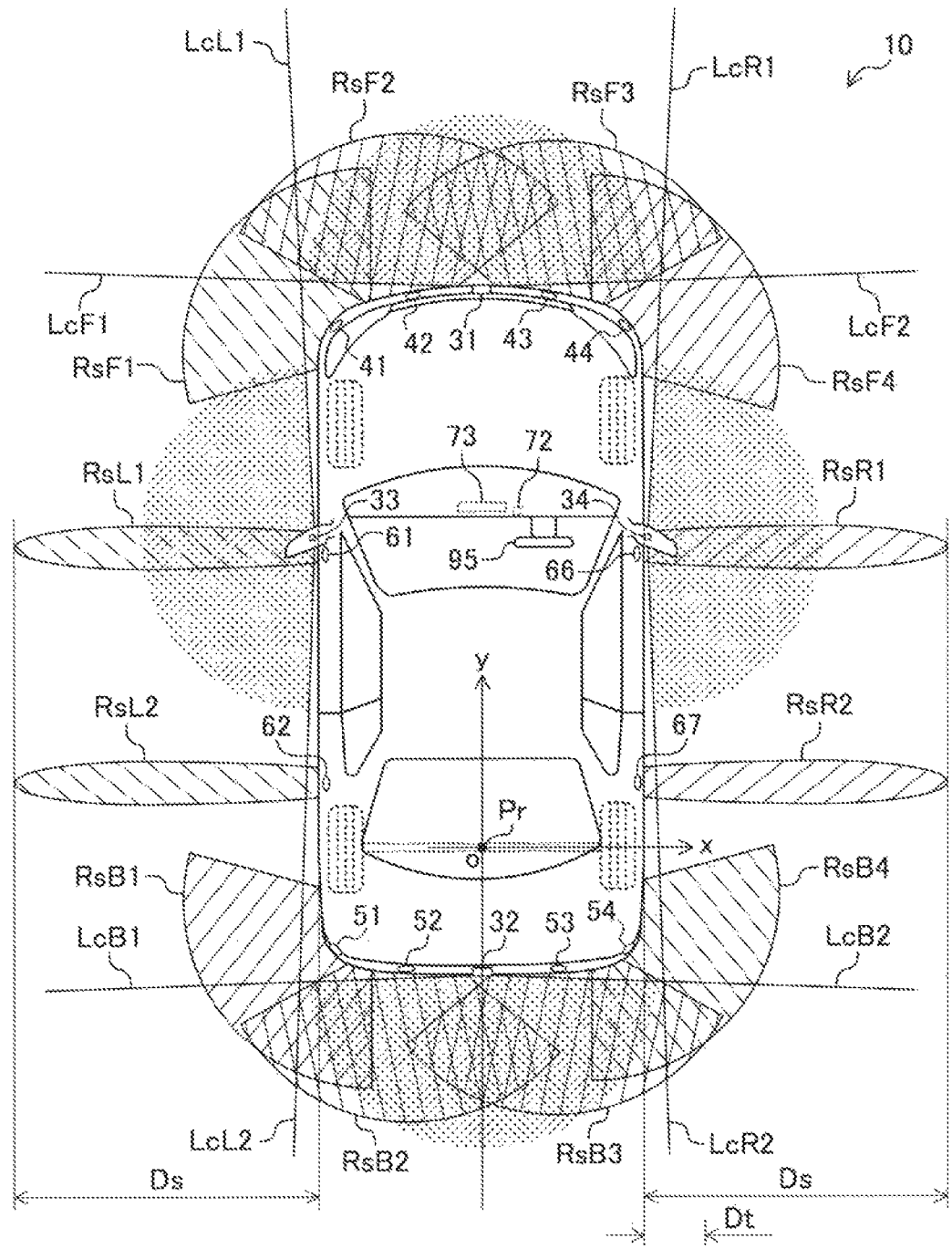
FIG. 1 is a schematic diagram of a vehicle (present vehicle) on which a parking assistance apparatus according to an embodiment of the present disclosure (present assistance apparatus) is mounted.

A parking assistance apparatus according to an embodiment of the present disclosure (hereinafter also referred to as the "present assistance apparatus") will now be described with reference to the drawings. The present assistance apparatus is applied to a vehicle 10 shown in FIG. 1. As understood from FIG. 2 illustrating a block diagram of the present assistance apparatus, the present assistance apparatus includes a drive assistance ECU 21, a drive control ECU 22, a brake control ECU 23, and an EPS-ECU 24 each of which is an electronic control unit (ECU).

The drive assistance ECU 21 includes a micro-computer, as a major component, which is equipped with a CPU, a non-volatile memory, and a RAM. The CPU performs data reading, numerical computation, computation result output, and so on, by repeatedly executing predetermined programs (routines). The non-volatile memory is formed by a rewritable flash memory and stores the programs executed by the CPU, lookup tables (maps) read by the CPU during execution of the programs, and so on. The RAM stores data read by the CPU temporarily.

Each of the drive control ECU 22, the brake control ECU 23 and the EPS-ECU 24 includes a micro-computer as a major component similarly to the drive assistance ECU 21. These ECUs can perform data communication (can exchange data) with one another through a CAN (controller area network) 25.

In addition, each ECU can receive output values of a sensor connected to one of the other ECUs through the CAN 25 from that ECU to which the sensor is connected. For example, a steering angle sensor 92 which is described later is connected to the EPS-ECU 24, and the drive assistance ECU 21 can receive a steering angle θs detected by the steering angle sensor 92 from the EPS-ECU 24 via the CAN 25.

The drive assistance ECU 21 is connected to a front camera 31, a rear camera 32, a left side camera 33, a right side camera 34, a front sonar apparatus 40, a rear sonar apparatus 50, a left side sonar apparatus 60, a right side sonar apparatus 65, a vehicle speed sensor 71, an operation button 72, a display 73, and a speaker 74.

(Configuration—Camera Apparatus)

Figure 2:
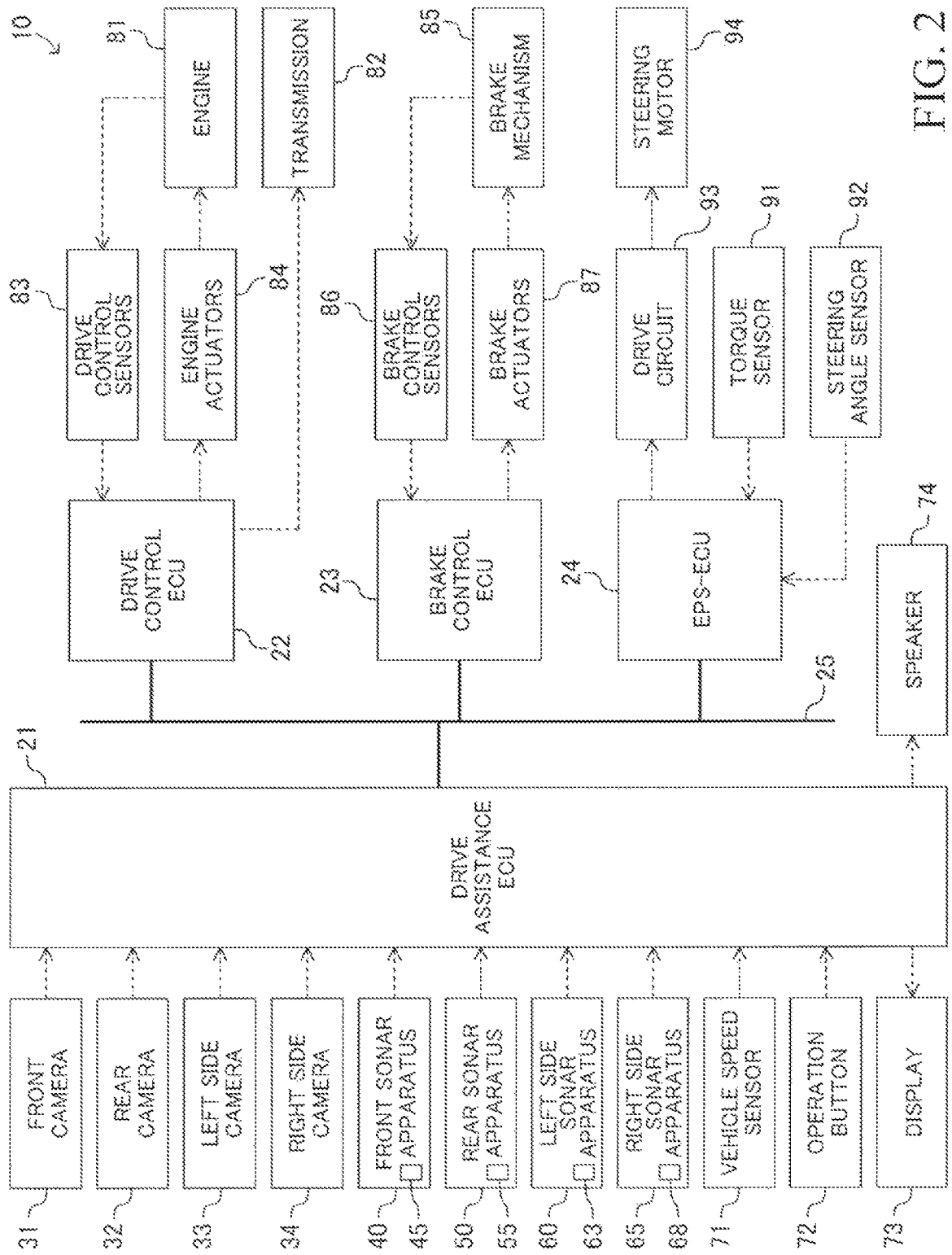
FIG. 2 is a block diagram of the present assistance apparatus.

As shown in FIG. 1, the front camera 31 is disposed at the center of the front end of the vehicle 10. The front camera 31 obtains information (more specifically, static image data) representing a "front image" which is a captured image (picture) of a region in front of the vehicle 10 every time a predetermined time interval ΔTc elapses, and outputs data representing the front image to the drive assistance ECU 21. A captured region (angle of view) of the front camera 31 in the lateral plane is equal to a range between a straight line LcF1 and a straight line LcF2.

The rear camera 32 is disposed at the center of the rear end of the vehicle 10. The rear camera 32 obtains information representing a "rear image" which is a captured image of a region behind the vehicle 10 every time the time interval ΔTc elapses, and outputs data representing the rear image to the drive assistance ECU 21, The captured region (angle of view) of the rear camera 32 in the lateral plane is equal to a range between a straight line LcB1 and a straight line LcB2.

The left side camera 33 is disposed at a position below a left door mirror (side mirror) of the vehicle 10. The left side camera 33 obtains information representing a "left side image" which is a captured image of a region on a left side of the vehicle 10 every time the time interval ΔTc elapses, and outputs data representing the left side image to the drive assistance ECU 21. The captured region (angle of view) of the left side camera 33 in the lateral plane is equal to a range between a straight line LcL1 and a straight line LcL2.

The right side camera 34 is disposed at a position below a right door mirror of the vehicle 10. The right side camera 34 obtains information representing a "right side image" which is a captured image of a region on a right side of the vehicle 10 every time the time interval ΔTc elapses, and outputs data representing the right side image to the drive assistance ECU 21. The captured region (angle of view) of the right side camera 34 in the lateral plane is equal to a range between a straight line LcR1 and a straight line LcR2.

Hereinafter, these images (namely, the front image, the rear image, the left side image and the right side image) obtained by the front camera 31, the rear camera 32, the left side camera 33 and the right side camera 34 may sometimes be referred to as a "surrounding image" collectively.

(Configuration—Sonar Apparatus)

The front sonar apparatus 40 includes a left front corner sonar 41, a left front center sonar 42, a right front center sonar 43, a right front corner sonar 44 and a front sonar control section 45. As shown in FIG. 1, the left front corner sonar 41 is disposed at the left-front corner of the vehicle 10. A region in which the left front corner sonar 41 can detect an object is approximately represented by a region RsF1. The left front center sonar 42 is disposed at the front end of the vehicle 10 and located on the left side of the center. A region in which the left front center sonar 42 can detect an object is approximately represented by a region RsF2.

The right front center sonar 43 is disposed at the front end of the vehicle 10 and located on the right side of the center. A region in which the right front center sonar 43 can detect an object is approximately represented by a region RsF3. The right front corner sonar 44 is disposed at the right-front corner of the vehicle 10. A region in which the right front corner sonar 44 can detect an object is approximately represented by a region RsF4.

Each of the left front corner sonar 41, the left front center sonar 42, the right front center sonar 43 and the right front corner sonar 44 includes a sonar transmission section, and a sonar reception section (both are not shown.). Each of the sonar transmission sections transmits an ultrasonic wave as a "sonar transmission wave" in response to an instruction from the front sonar control section 45. When the sonar reception section receives a reflected wave (sonar reflected wave) generated by reflection of the sonar transmission wave at an object, the sonar reception section outputs information about the sonar reflected wave such as the frequency and strength of the sonar reflected wave (sonar reflected wave information) to the front sonar control section 45.

The front sonar control section 45 executes "sonar object detection processing" every time a predetermined time interval ΔTs elapses. The sonar object detection processing is processing to detect an object and to obtain (figure out) the position of the object (relative position with respect to the vehicle 10) and the speed of the object (relative speed with respect to the vehicle 10), on the basis of the sonar reflected wave information sent from the sonar reception sections. When the object is detected by executing the sonar object detection processing, the front sonar control section 45 sends information about the detected object including the position and the speed as "sonar object information" to the drive assistance ECU 21.

The rear sonar apparatus 50 includes a left rear corner sonar 51, a left rear center sonar 52, a right rear center sonar 53, a right rear corner sonar 54, and a rear sonar control section 55. The left rear corner sonar 51 is disposed at the left-rear corner of the vehicle 10. A region in which the left rear corner sonar 51 can detect an object is approximately represented by a region RsB1. The left rear center sonar 52 is disposed at the rear end of the vehicle 10 and located on the left side of the center. A region in which the left rear center sonar 52 can detect an object is approximately represented by a region RsB2.

The right rear center sonar 53 is disposed at the rear end of the vehicle 10 and located on the right side of the center.

A region in which the right rear center sonar 53 can detect an object is approximately represented by a region RsB3. The right rear corner sonar 54 is disposed at the right-rear corner of the vehicle 10. A region in which the right rear corner sonar 54 can detect an object is approximately represented by a region RsB4.

Each of the left rear corner sonar 51, the left rear center sonar 52, the right rear center sonar 53 and the right rear corner sonar 54 includes the sonar transmission section and the sonar reception section (both are not shown.) similarly to the front sonar apparatus 40. Each of the sonar transmission sections transmits the sonar transmission wave in response to an instruction from the rear sonar control section 55. When the sonar reception section receives the sonar reflected wave, the sonar reception section outputs the sonar reflected wave information to the rear sonar control section 55.

The rear sonar control section 55 executes the sonar object detection processing every time the time interval ΔTs elapses. When the object is detected by executing the sonar object detection processing, the rear sonar control section 55 sends the sonar object information to the drive assistance ECU 21.

The left side sonar apparatus 60 includes a left side front sonar 61, a left side rear sonar 62, and a left side sonar control section 63. The left side front sonar 61 is disposed at a position closer to the front end and on the left side of a vehicle body of the vehicle 10. A region in which the left side front sonar 61 can detect an object is approximately represented by a region RsL1. The left side rear sonar 62 is disposed at a position closer to the rear end and on the left side of the vehicle body of the vehicle 10. A region in which the left side rear sonar 62 can detect an object is approximately represented by a region RsL2.

As understood from FIG. 1, the left side sonar apparatus 60 can detect the object that is present within a detection distance Ds from the left end of the vehicle body of the vehicle 10.

Each of the left side front sonar 61 and the left side rear sonar 62 includes the sonar transmission section and the sonar reception section (both are not shown.) similarly to the front sonar apparatus 40. Each of the sonar transmission sections transmits the sonar transmission wave in response to an instruction from the left side sonar control section 63. When the sonar reception section receives the sonar reflected wave, the sonar reception section outputs the sonar reflected wave information to the left side sonar control section 63.

The left side sonar control section 63 executes the sonar object detection processing every time the time interval ΔTs elapses. When the object is detected by executing the sonar object detection processing, the left side sonar control section 63 sends the sonar object information to the drive assistance ECU 21.

The right side sonar apparatus 65 includes a right side front sonar 66, a right side rear sonar 67, and a right side sonar control section 68. The right side front sonar 66 is disposed at a position closer to the front end and on the right side of the vehicle body of the vehicle 10. A region in which the right side front sonar 66 can detect an object is approximately represented by a region RsR1. The right side rear sonar 67 is disposed at a position closer to the rear end and on the right side of the vehicle body of the vehicle 10. A region in which the right side rear sonar 67 can detect an object is approximately represented by a region RsR2.

The right side sonar apparatus 65 can detect the object that is present within a detection distance Ds from the right end of the vehicle body of the vehicle 10 similarly to the left side sonar apparatus 60.

Each of the right side front sonar 66 and the right side rear sonar 67 includes the sonar transmission section and the sonar reception section (both are not shown.) similarly to the front sonar apparatus 40. Each of the sonar transmission sections transmits the sonar transmission wave in response to an instruction from the right side sonar control section 68. When the sonar reception section receives the sonar reflected wave, the sonar reception section outputs the sonar reflected wave information to the right side sonar control section 68.

The right side sonar control section 68 executes the sonar object detection processing every time the time interval ΔTs elapses. When the object is detected by executing the sonar object detection processing, the right side sonar control section 68 sends the sonar object information to the drive assistance ECU 21.

Hereinafter, the object detected by each of the front sonar apparatus 40, the rear sonar apparatus 50, the left side sonar apparatus 60 and the right side sonar apparatus 65 may sometimes be referred to as a "sonar object." The left side sonar apparatus 60 and the right side sonar apparatus 65 are also referred to as "object detection sensor devices" for convenience' sake. The regions (namely, the region RsL1 and the region RsL2) in which an object that can be detected by the left side sonar apparatus 60 is present and the regions (namely, the region RsR1 and the region RsR2) in which an object that can be detected by the right side sonar apparatus 65 is present are also referred to as "detection regions" for convenience' sake.

(Configuration—Others)

The vehicle speed sensor 71 detects a vehicle speed Vt which is a speed of the vehicle 10 and output a signal indicative of the vehicle speed Vt to the drive assistance ECU 21.

The operation button 72 is a push button switch arranged in a vehicle compartment of the vehicle 10 and within a reach of a driver of the vehicle 10. The operation button 72 outputs a signal indicating whether or not the operation button 72 is being pressed to the drive assistance ECU 21.

Hereinafter, a series of operations from a start of pressing the operation button 72 to an end of pressing the operation button 72 is referred to as "parking assistance starting operation." The driver of the vehicle 10 performs the parking assistance starting operation in order to make (let) the drive assistance ECU 21 start "parking assistance processing."

The display 73 is an LCD (liquid crystal display) placed at an appropriate position in the vehicle compartment so that the driver can view the display 73. Characters, figures, and the like to be displayed on the display 73 are controlled by the drive assistance ECU 21.

In addition, the display 73 also functions as a touch panel. Specifically, when the driver touches the display 73, the display 73 outputs information regarding a position touched by the driver to the drive assistance ECU 21. Accordingly, the driver can provide (send) an instruction to the drive assistance ECU 21 by touching the display 73.

The speaker 74 is disposed in the vehicle compartment of the vehicle 10. A warning sound, a voice message and the like to be played by the speaker 74 are controlled by the drive assistance ECU 21.

(Control of Drive Force)

The drive control ECU 22 controls an engine 81 and a transmission 82 so as to adjust (control) a drive force of the vehicle 10 (see FIG. 2). The drive control ECU 22 is connected to a plurality of drive control sensors 83 and receives detection signals from these sensors. The drive control sensors 83 are sensors for detecting operation state quantities (parameters) of the engine 81, and operation states of the driver related to the drive force control. The drive control sensors 83 include an accelerator pedal operation amount (depression amount) sensor, a shift position sensor which detects an operation status of a shift lever, a throttle valve opening sensor, an engine rotational speed sensor, an intake air amount sensor. The drive control ECU 22 determines a required drive torque Dreq which is a required value of a drive torque Dd described later, on the basis of the vehicle speed Vt and output values of the drive control sensors 83.

In addition, the drive control ECU 22 is connected to engine actuators 84 including a throttle valve actuator, and a fuel injection valve, and controls the engine actuators 84 so as to control a torque generated by the engine 81. The drive control ECU 22 controls the engine actuators 84 and the transmission 82 such that the "drive torque Dd which is a torque transmitted to drive wheels of the vehicle 10" coincides with the required drive torque Dreq, to thereby control an acceleration As which is a change amount of the vehicle speed Vt per unit time.

Furthermore, the drive control ECU 22 switches shift modes of the transmission 82 in response to the operation to the shift lever by the driver. The shift modes include a "forward mode," a "reverse (backward) mode," a "neutral mode," and a "parking mode." When the shift mode is the forward mode, the vehicle 10 moves forward by the drive force of the engine 81. When the shift mode is the reverse mode, the vehicle 10 moves backward by the drive force of the engine 81.

When the shift mode is the neutral mode, the drive force is not transmitted to the drive wheels of the vehicle 10. When the shift mode is the parking mode, a lock mechanism (not shown) that prevents rotation of the drive wheels of the vehicle 10 is in operation.

Furthermore, when the drive control ECU 22 receives a "drive force control request" including a target drive force Ddtg from the drive assistance ECU 21, the drive control ECU 22 controls the engine actuators 84 and the transmission 82 such that the actual value of the drive torque Dd coincides with the target drive force Ddtg. In addition, when the drive control ECU 22 receives a "shift change request" including a "target shift mode" from the drive assistance ECU 21, the drive control ECU 22 controls the transmission 82 such that the actual shift mode coincides with the target shift mode.

(Control of Brake Force)

The brake control ECU 23 controls a brake mechanism 85 which is formed by a hydraulic friction brake apparatus installed on the vehicle 10. The brake control ECU 23 is connected to a plurality of brake control sensors 86 and receives detection signals from these sensors. The brake control sensors 86 are sensors for detecting state quantities used for controlling the brake mechanism 85, and operation state of the driver related to the brake force control. The brake control sensors 86 include an operation amount sensor for detecting the operation amount of a brake pedal, pressure sensors of brake oil applied to the brake mechanism 85, and so on. The brake control ECU 23 determines a required brake force Breq which is a required value of a brake force Bf described later, on the basis of the vehicle speed Vt and output values of the brake control sensors 86.

In addition, the brake control ECU 23 is connected to a plurality of brake actuators 87 which are hydraulic actuators of the brake mechanism 85. The brake control ECU 23 controls the brake actuators 87 such that "the actual value of the brake force Bf which is a total force of a frictional brake force applied to each of wheels" coincides with the required brake force Breq so as to control the acceleration As (in this case, negative acceleration; namely, deceleration).

Furthermore, when the brake control ECU 23 receives a "brake force control request" including a target brake force Bftg from the drive assistance ECU 21, the brake control ECU 23 controls the brake actuators 87 such that the actual value of the brake force Bf coincides with the target brake force Bftg.

(Control of Assist Torque and Steering Angle)

The EPS-ECU 24 is connected to a torque sensor 91 and the steering angle sensor 92 and receives detection signals from these sensors. The torque sensor 91 detects a steering torque Tw which is a torque added to a steering wheel 95 (see FIG. 1) by the driver and outputs a signal indicative of the steering torque Tw. The steering angle sensor 92 detects the steering angle θs which is a rotational angle of the steering wheel 95 and outputs a signal indicative of the steering angle θs.

When the steering wheel 95 is in a neutral position, the steering angle θs is "0." When the steering wheel 95 is rotated clockwise, the steering angle θs becomes a positive vale (namely, θs>0). When the steering wheel 95 is rotated counterclockwise, the steering angle θs becomes a negative vale (namely, θs<0).

The EPS-ECU 24 determines a target assist torque Tatg which is a target value of a torque (assist torque) to assist operation to the steering wheel 95 by the driver, on the basis of the vehicle speed Vt, the steering torque Tw and the steering angle θs and so on.

The EPS-ECU 24 is connected to a drive circuit 93. The drive circuit 93 supplies electrical power to a steering motor 94. The steering motor 94 generates a torque Tm which rotates a steering shaft connected to the steering wheel 95. The EPS-ECU 24 controls the drive circuit 93 such that the actual value of the torque Tm coincides with the target assist torque Tatg.

Furthermore, when the EPS-ECU 24 receives a "steering angle control request" including a target steering angle θstg from the drive assistance ECU 21, the EPS-ECU 24 controls the steering motor 94 such that the actual value of the steering angle θs coincides with the target steering angle θstg.

(Parking Assistance Processing)

When the driver of the vehicle 10 performs the parking assistance starting operation, the drive assistance ECU 21 starts the parking assistance processing. The parking assistance processing is processing to assist the driver to park the vehicle 10 to a "target parking position" which has been registered in advance in the drive assistance ECU 21. The parking assistance processing includes a "route obtaining processing" and a "travelling assistance processing." The route obtaining processing is processing for specifying (identifying) the target parking position with respect to the present (current) position of the vehicle 10 and for obtaining (calculating) a "target travelling route (path)" which is a route from the present position of the vehicle 10 to the target parking position. The travelling assistance processing is processing for making (letting) the vehicle 10 travel (run/move) along/on the target travelling route.

In association with the parking assistance processing, the drive assistance ECU 21 executes "parking position registering processing" and "collision avoiding processing." The parking position registering processing is processing for registering (storing) the target parking position in the drive assistance ECU 21. The collision avoiding processing is processing for stopping travelling (moving) of the vehicle 10 when the vehicle 10 is highly likely to collide with an obstacle while the travelling assistance processing is being executed.

In the following description of the parking assistance processing, the center point of a wheel axis of rear wheels of the vehicle 10 in a lateral direction shown in FIG. 1 is referred to as a reference point Pr. In addition, an X-Y coordinate system whose origin is the reference point Pr is defined (introduced). An axis which extends in the lateral direction (width direction) of the vehicle 10 is an X coordinate axis, and an axis which extends in a longitudinal direction of the vehicle 10 is a Y coordinate axis. Therefore, the X coordinate axis and the Y coordinate axis are orthogonal to each other. The X coordinate assumes a positive value on the right side with respect to the heading direction of the vehicle 10 moving forward and assumes a negative value on the left side with respect to the heading direction of the vehicle 10 moving forward. The Y coordinate assumes a positive value on one side of the origin toward the forward direction of the vehicle 10 and assumes a negative value on the other side of the origin toward the backward direction of the vehicle 10.

When the driver performs a predetermined operation so as to cause the drive assistance ECU 21 to execute the parking position registering processing, the drive assistance ECU 21 stores a plurality of "characteristic points" related to (or to specify) the target parking position in the non-volatile memory. In the present embodiment, each of the characteristic points is a square shaped area (namely, a part of an image) including a predetermined number of pixels.

When the parking position registering processing is being executed, the drive assistance ECU 21 generates (obtains), on the basis of the surrounding images, an "overhead image" which is the substantially same image as an image (bird's-eye view image) obtained by photographing the vehicle 10 and the surrounding of the vehicle 10 from above. The drive assistance ECU 21 extracts the characteristic points from the overhead image, and stores those characteristic points in the non-volatile memory with positions (namely, X coordinate values and Y coordinate values) with respect to the reference point Pr in a case where the vehicle 10 is (imaginally/hypothetically) positioned at the target parking position.

When the parking assistance processing (specifically, the route obtaining processing) is started, the drive assistance ECU 21 searches (looks) for the characteristic points that are contained in the present/current overhead image (specifically, the overhead image obtained on the basis of the present/current surrounding images) by means of a well-known template matching method in order to specify (identify) the target parking position. When a sufficient number of the characteristic points are detected, the drive assistance ECU 21 specifies the target parking position with respect to the present position of the vehicle 10. More specifically, the drive assistance ECU 21 obtains the followings (a) to (c).

(a) A distance between a position Prtgt and a position Prnow. The position Prtgt is a position of "the reference point Pr of the vehicle 10 located at the target parking position". In other words, the position Prtgt means a position of the reference point Pr of when the vehicle 10 is hypothetically (virtually) parked at the target parking position. The position Prnow is a position of "the reference point Pr of the vehicle 10 that is at the present position."

(b) A direction of the position Prtgt with respect to the position Prnow.

(c) A yaw angle difference that is a difference between a yaw angle (namely, a direction of the longitudinal axis) of the vehicle 10 of when the vehicle 10 is located at the present position and the yaw angle of the vehicle 10 of when the vehicle 10 is hypothetically (virtually) at the target parking position.

Figure 3:
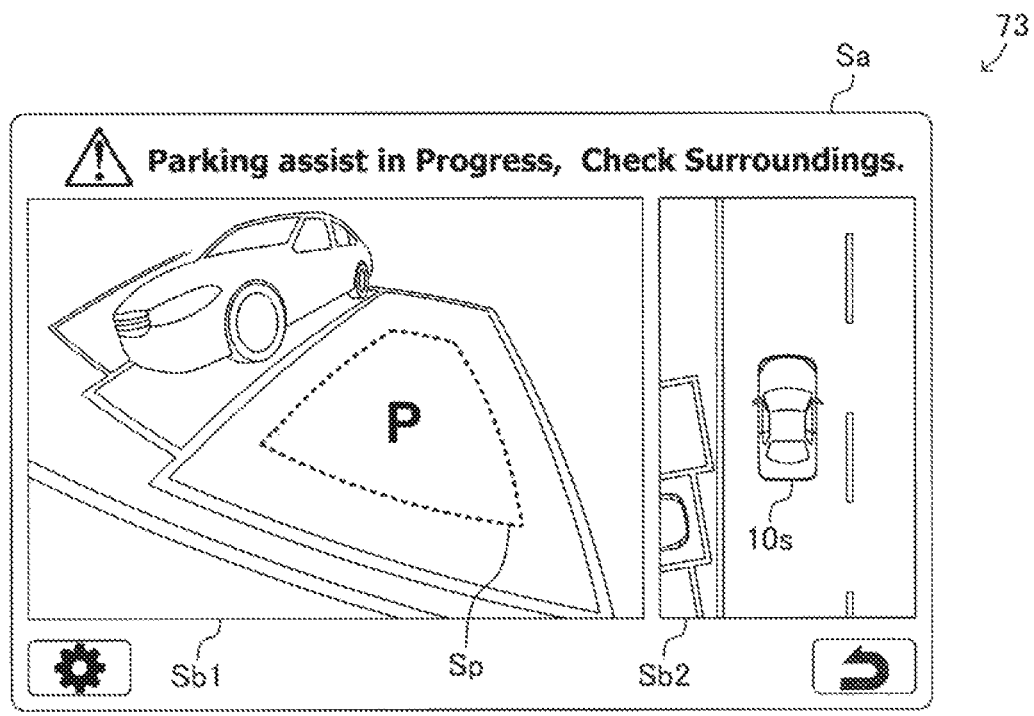
FIG. 3 is an example of a parking assistance screen which is displayed on a display of the present assistance apparatus.

In addition, the drive assistance ECU 21 displays a parking assistance screen Sa exemplified in FIG. 3 on the display 73. The parking assistance screen Sa includes a left sub screen Sb1 and a right sub screen Sb2. In the left sub screen Sb1, a part of the surrounding image including the specified target parking position and a region around that target parking position is displayed. A parking region (parking space, parking lot) Sp contained in the left sub screen Sb1 indicates the specified target parking position. In the right sub screen Sb2, a vehicle symbol 10s representing the vehicle 10 and the overhead image are displayed.

Notably, since processing for storing the characteristic points and for obtaining the positional relation (e.g., the above-described (a) to (c)) between the present position and the target parking position on the basis of the stored characteristic point is well-known, detailed explanation is omitted (see, for example, Japanese Patent Application Laid-Open (kokai) Nos. 2017-21427, 2017-138664 and 2018-127065).

(Parking Assistance Processing—Travelling Assistance Processing)

Figure 4:
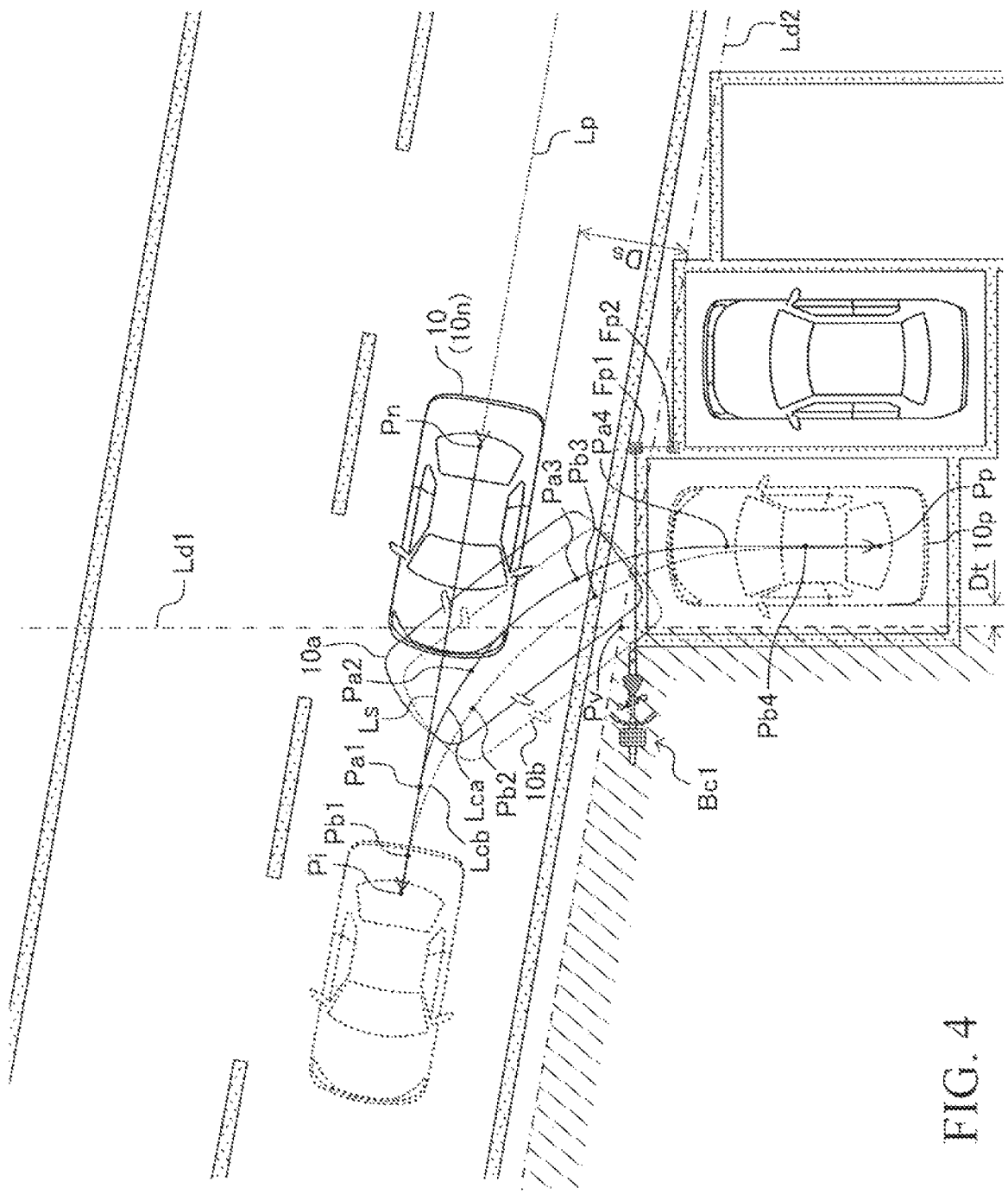
FIG. 4 is an example of a target travelling route from the present position of the present vehicle to a target parking position.

First, the travelling assistance processing will be specifically described with the collision avoidance processing, and then, the route obtaining processing will be described. An example of the target parking position and the target travelling route led to that target parking position is shown in FIG. 4. A vehicle position 10p in FIG. 4 indicates the target parking position (namely, the vehicle 10 parked at the target parking position). A point Pp is the reference point Pr of the vehicle 10 parked at the target parking position. A region Fp1 and a region Fp2 are examples of the characteristic points related to the target parking position.

A point Pn represents the reference point Pr of the vehicle 10 of when the parking assistance starting operation is performed. A position of the vehicle 10 at this point in time may be referred to as a vehicle position 10n. A dashed line Lp indicates a locus (namely, a route along/on which the vehicle 10 has already traveled) of the reference point Pr until the reference point Pr reaches the point Pn.

In the present example, the target travelling route obtained by the drive assistance ECU 21 includes a straight line Ls from the point Pn to a point Pi, and a curved line Lca from the point Pi to the point Pp. The straight line Ls is a section along/on which the vehicle 10 travels (moves) forward, and the curved line Lca is a section along/on which the vehicle 10 travels (moves) backward.

The curved line Lca (namely, the section along which the vehicle 10 travels backward to reach the target parking position) is referred to as the "backward section" for convenience' sake. The straight line Ls (namely, the section along which the vehicle 10 travels forward to reach a start point of the backward section) is referred to as the "forward section" for convenience' sake. The point Pi (namely, a point which is an end point of the forward section and the start point of the backward section) is referred to as the "reverse position" for convenience' sake.

When the travelling assistance processing is started and the vehicle 10 starts travelling (moving) along the straight line Ls, the drive assistance ECU 21 controls the drive control ECU 22 such that the shift mode is changed to the forward mode. Namely, the drive assistance ECU 21 sends, to the drive control ECU 22, the shift change request requiring that target shift mode be the forward mode. After starting of travelling (moving) of the vehicle 10, the drive assistance ECU 21 makes the vehicle 10 stop at the point Pi. Subsequently, the drive assistance ECU 21 controls the drive control ECU 22 so as to switch the shift mode to reverse mode, and then makes the vehicle 10 travel (move) along the curved line Lca.

While the travelling assistance processing is being executed so as to cause the vehicle 10 to move along the target travelling route, the drive assistance ECU 21 controls the drive control ECU 22 such that the vehicle speed Vt coincides with a predetermined route travelling speed Vr. Specifically, the drive assistance ECU 21 executes processing for sending, to the drive control ECU 22, the drive force control request including the target drive force Ddtg at a predetermined time interval.

At this time, the drive assistance ECU 21 obtains (figures out) a target acceleration Astg such that the vehicle speed Vt coincides with the route travelling speed Vr. In addition, the drive assistance ECU 21 obtains (figures out) the target drive force Ddtg such that the acceleration As coincides with the target acceleration Astg.

Furthermore, while the travelling assistance processing is being executed, the drive assistance ECU 21 controls the steering angle θs such that the vehicle 10 travels (moves) along the target travelling route. Specifically, the drive assistance ECU 21 executes processing for sending, to the EPS-ECU 24, the steering angle control request including the target steering angle θstg at a predetermined time interval.

At this time, the drive assistance ECU 21 obtains a difference (namely, an amount of deviation from the target travelling route) between the present position of the vehicle 10 and the target travelling route (in the width direction of the vehicle 10), and obtains (figures out) the target steering angle θstg on the basis of the difference. The drive assistance ECU 21 obtains (estimates) the present position of the vehicle 10 with respect to the target travelling route on the basis of a history (record) of the vehicle speed Vt and the steering angle θs. In addition, the drive assistance ECU 21 corrects (modifies) the present position of the vehicle 10 with respect to the target travelling route, when a sufficient number of the characteristic points contained in the surrounding image are found (namely, when the present position of the vehicle 10 with respect to the target parking position is accurately obtained on the basis of the characteristic points).

When the vehicle 10 approaches any one of the point Pi (namely, the reverse position) and the point Pp (namely, the target parking position), the drive assistance ECU 21 obtains (figures out) the target brake force Bftg that is required to stop the vehicle 10. In addition, the drive assistance ECU 21 sends, to the brake control ECU 23, the brake force control request including that target brake force Bftg.

As understood from FIG. 4, the curved line Lca includes (passes through) a point Pa1, a point Pa2, a point Pa3, and a point Pa4. After a point in time when the vehicle 10 (i.e., the reference point Pr) reaches the point Pa1, a magnitude |θs| of the steering angle θs starts to increase from "0." In the present example, the steering angle θs has become a negative value at this time. After that, when the vehicle 10 (i.e., the reference point Pr) reaches the point Pa2, the magnitude |θs| of the steering angle θs stops increasing.

After a point in time when the vehicle 10 (i.e., the reference point Pr) reaches the point Pa3, the magnitude |θs| of the steering angle θs decreases. In other words, while the vehicle 10 travels/moves from the point Pa2 to the point Pa3, the steering angle θs remains unchanged. When the vehicle 10 (i.e., the reference point Pr) reaches the point Pa4, the steering angle θs is "0." In this manner, in a period when the vehicle moves along a section from the point Pa2 to the point Pa4, the vehicle 10 turns (namely, the yaw angle of the vehicle 10 changes).

Here, the collision avoiding processing will be described. When the sonar object (hereinafter, also referred to as an "obstacle") with which the vehicle 10 is highly likely to collide is detected while the vehicle 10 is travelling along the target travelling route, the drive assistance ECU 21 execute the collision avoiding processing. In the present embodiment, the sonar object is regarded/treated as the obstacle when a distance between that object and the vehicle 10 is smaller (shorter) than a predetermined threshold distance Dt (see FIGS. 1 and 4).

When the obstacle is detected while the travelling assistance processing is being executed, the drive assistance ECU 21 obtains (figures out) the target brake force Bftg that is required to avoid a collision between the vehicle 10 and that obstacle, and sends the brake force control request including that target brake force Bftg to the brake control ECU 23. After that, the drive assistance ECU 21 executes the route obtaining processing so as to obtain a new (a different) target travelling route. An example of the new target travelling route newly obtained due to the detection of the obstacle will be described later.

Incidentally, there will be a higher possibility that the driver and passengers of the vehicle 10 feel a sense of discomfort (oppression) as a change rate of the steering angle θs (namely, a change amount of magnitude |θs| of the steering angle θs per unit time) during the execution of the travelling assistance processing becomes larger. In addition, as the change rate of the steering angle θs becomes larger, a difference between an "acceleration tracking time" described below and a "steering angle tracking time" described below will become larger, and as a result, there will a higher possibility that the difference between the actual present position of the vehicle 10 and the target travelling route becomes larger.

The acceleration tracking time is a time duration from a point in time when the drive assistance ECU 21 sends, to the drive control ECU 22, the drive force control request including the target drive force Ddtg updated on the basis of the target acceleration Astg to a point in time when the actual value of the acceleration As coincides with the target acceleration Astg. The steering angle tracking time is a time duration from a point in time when the drive assistance ECU 21 sends, to the EPS-ECU 24, the steering angle control request including the updated target steering angle θstg to a point in time when the actual value of the steering angle θs coincides with the target steering angle θstg.

When the difference between the actual present position of the vehicle 10 and the target travelling route (in the width direction) becomes relatively large, it becomes difficult to match the actual position of the vehicle 10 with the target travelling route, and as a result, it will be necessary to newly obtain a different (another) target travelling route. Furthermore, the excessively large difference between the actual present position of the vehicle 10 and the target travelling route may make it difficult to newly obtain the different (another) target travelling route.

Therefore, it is desirable that the target travelling route be obtained (determined) such that (the magnitude/absolute value of) the change rate of the steering angle θs is relatively small when the vehicle 10 travels along that target travelling route. Hereinafter, a route along which the vehicle 10 can travel (move) with a relatively small magnitude/absolute value of the change rate of the steering angle θs is referred to as a "gentle (or smooth)" route.

(Parking Assistance Processing—Route Obtaining Processing)

In view of the above, when the route obtaining processing is executed, the drive assistance ECU 21 obtains the target travelling route such that that target travelling route is as gentle (smooth) as possible. The route obtaining processing will be described in detail while focusing on this point.

The drive assistance ECU 21 obtains (determines) the target travelling route such that the vehicle 10 does not enter a "specific region" when the vehicle 10 moves (travels) along the backward section (namely, a part of or all of the vehicle 10 does not overlap with the specific region during the travel along the backward section). More specifically, the drive assistance ECU 21 obtains the target travelling route such that the minimum value of a distance between the vehicle 10 and the specific region while the vehicle moves along the backward section is larger than a predetermined "clearance distance." In the present embodiment, the clearance distance is "0."

A method of defining the specific region will be described later. In the example of FIG. 4, the specific region is a region on the left side of a dash-dot-dash line Ld1 on the sheet of FIG. 4 and below a dash-dot-dash line Ld2 on the sheet of FIG. 4.

The dash-dot-dash line Ld1 is a straight line parallel to the longitudinal direction of the vehicle 10 located at the vehicle position 10p and on the left direction (a "specific direction" described later) side of the vehicle 10 located at the vehicle position 10p. In addition, a distance between the dash-dot-dash line Ld1 and the vehicle 10 located at the vehicle position 10p (namely, a distance from the vehicle body of the vehicle 10 located at the target parking position) is the threshold distance Dt. The dash-dot-dash line Ld1 is also referred to as a "specific line" for convenience' sake.

The dash-dot-dash line Ld2 is a straight line parallel to the longitudinal direction of the vehicle 10 located at the vehicle position 10n and on the left direction (namely, the specific direction) side of the vehicle 10 located at the vehicle position 10n. In addition, a distance between the dash-dot-dash line Ld2 and the vehicle position 10n (namely, a distance from the vehicle body of the vehicle 10 at a point in time when the route obtaining processing is started) is the detection distance Ds. The dash-dot-dash line Ld2 is also referred to as a "reference line" for convenience' sake.

In order to explain a reason why the specific region is considered when the target travelling route is obtained, it is assumed that the target travelling route which includes the straight line Ls and a dashed line Lcb has been obtained. As understood from FIG. 4, the dashed line Lcb includes (passes through) a point Pb1, a point Pb2, a point Pb3, and a point Pb4.

When the vehicle 10 moves from the point Pb1 to the point Pb2, the magnitude |θs| of the steering angle θs increases from "0." When the vehicle 10 moves from the point Pb2 to the point Pb3, the steering angle θs does not change. When the vehicle 10 moves from the point Pb3 to the point Pb4, the magnitude |θs| of the steering angle θs decreases down to "0."

As understood from FIG. 4, the section from the point Pb1 to the point Pb2 is longer than the section from the point Pa1 to the point Pa2. In addition, the section from the point Pb3 to the point Pb4 is longer than the section from the point Pa3 to the point Pa4. Therefore, the backward section indicated by the dashed line Lcb is a gentler (smother) route as compared to the backward section indicated by the curved line Lca.

A vehicle position 10a shown in FIG. 4 indicates a position of the vehicle 10 at a point in time when the reference point Pr reaches the point Pa3 while the vehicle 10 moves along the curved line Lca. A vehicle position 10b indicates a position of the vehicle 10 at a point in time when the reference point Pr reaches the point Pb3 while the vehicle 10 moves along the dashed line Lcb.

As understood from FIG. 4 (especially, the vehicle position 10b), the vehicle 10 collides with a bicycle Bc1 when the vehicle 10 moves along the backward section indicated by the dashed line Lcb. Accordingly, the collision avoiding processing is executed while the vehicle 10 moves along the dashed line Lcb. Namely, in this case, the assist interruption occurs. In a case where the assist interruption occurs, the drive assistance ECU 21 needs to make (let) the vehicle 10 move forward again, and then, travel along the newly obtained target travelling route. Therefore, in this case, a travelling route of the vehicle 10 gets (becomes) complicated.

In the present example, the bicycle Bc1 is in a region below the dash-dot-dash line Ld2 on the sheet of the FIG. 4. Accordingly, a distance between the vehicle 10 and the bicycle Bc1 does not become smaller than the detection distance Ds while the vehicle 10 moves along the forward section. Therefore, when the vehicle 10 moves along the forward section, the bicycle Bc1 cannot be detected by the left side sonar apparatus 60.

In view of the forgoing, the drive assistance ECU 21 obtains, as the backward section, the path represented by the curved line Lca instead of the path represented by the dashed line Lcb. Namely, the drive assistance ECU 21 obtains the target travelling route such that that target travelling route is as gentle (smooth) as possible, whereas the drive assistance ECU 21 suppresses (decreases) a possibility that the assist interruption occurs while the vehicle 10 moves along the backward section by preventing the vehicle 10 from entering the specific region. As understood from the vehicle position 10a, the vehicle 10 does not collide with the bicycle Bc1 in a case where the vehicle 10 moves along the path represented by the curved line Lca.

The specific direction used for defining the specific region is one of the right direction and the left direction, and is a direction in which the target parking position (namely, the vehicle position 10p) is present with respect to present position of the vehicle 10 (namely, the vehicle position 10n). In other words, the target parking position is present in the specific direction side of the present position of the vehicle 10. The specific direction in the present example shown in FIG. 4 is the left direction.

In the example shown in FIG. 4, the forward section is a straight line (namely, the straight line Ls), and thus, a part of the dash-dot-dash line Ld2 is a boundary between a first region and a second region. The left side sonar apparatus 60 can detect the sonar object present in the first region while the vehicle 10 move along the forward section, whereas, the left side sonar apparatus 60 cannot detect the sonar object in the second region while the vehicle 10 move along the forward section. In other words, the left side sonar apparatus 60 cannot detect the sonar object in the region (the second region) below the dash-dot-dash line Ld2 on the sheet of FIG. 4 (namely, the region on the specific direction side of the dash-dot-dash line Ld2 with respect to the vehicle position 10n) when the vehicle 10 moves along the forward section.

Meanwhile, the region above the dash-dot-dash line Ld2 on the sheet of FIG. 4 includes a set of the detection regions (the region RsL1 and the region RsL2) at each moment of the left side sonar apparatus 60 which moves together with the vehicle 10 while the vehicle 10 moves along the forward section. This set of the detection regions is referred to as a "sum set region" for convenience' sake.

In other words, the sum set region is the set (sum) of the detection region at each moment on the specific direction side of the vehicle 10 which moves (accompanied with the travel of the vehicle 10) along the forward section. Namely, the sum set region includes the detection regions each of which is present on the specific direction side of the vehicle 10 that changes its position sequentially (moment by moment) as the vehicle 10 moves along the forward section. Accordingly, if the specific direction is the left direction, the sonar object that is present in the sum set region is detected by the left side sonar apparatus 60 while the vehicle 10 moves along the forward section. Meanwhile, if the specific direction is the right direction, the sonar object that is present in the sum set region is detected by the right side sonar apparatus 65 while the vehicle 10 moves along the forward section.

Accordingly, by obtaining the target travelling route such that the vehicle 10 does not enter the specific region (namely, the vehicle 10 passes through the sum set region) while the vehicle 10 moves along the backward section, the possibility that the assist interruption occurs can be reduced. In view of this, the drive assistance ECU 21 obtains the target travelling route such that the vehicle 10 does not enter the specific region while the vehicle 10 moves along the backward section and the target travelling route becomes as gentle (smooth) as possible, when the route obtaining processing is executed.

Next, operation of the drive assistance ECU 21 in a case where the sonar object (hereinafter, also referred to as a "candidate obstacle") different from the obstacle is detected in the sum set region while the vehicle 10 moves along the forward section will be described with reference to an example shown in FIG. 5. The candidate obstacle is the sonar object with which the vehicle 10 is not likely to collide while the vehicle 10 moves along the forward section but with which the vehicle 10 is highly likely to collide while the vehicle 10 moves along the backward section. Namely, a distance between the vehicle 10 and the candidate obstacle does not become smaller than the threshold distance Dt while the vehicle 10 moves along the forward section. Whereas, the distance between the vehicle 10 and the candidate obstacle becomes smaller than the threshold distance Dt while the vehicle 10 moves along the backward section. Accordingly, the collision avoiding processing is not executed for the candidate obstacle while the vehicle 10 moves along the forward section, but is executed while the vehicle 10 moves along the backward section. Therefore, if the candidate obstacle is detected (while the vehicle 10 moves along the forward section), it is necessary to newly obtain the different/new target travelling route (especially, the different/new backward section) in order to avoid colliding with the candidate obstacle.

Figure 5:
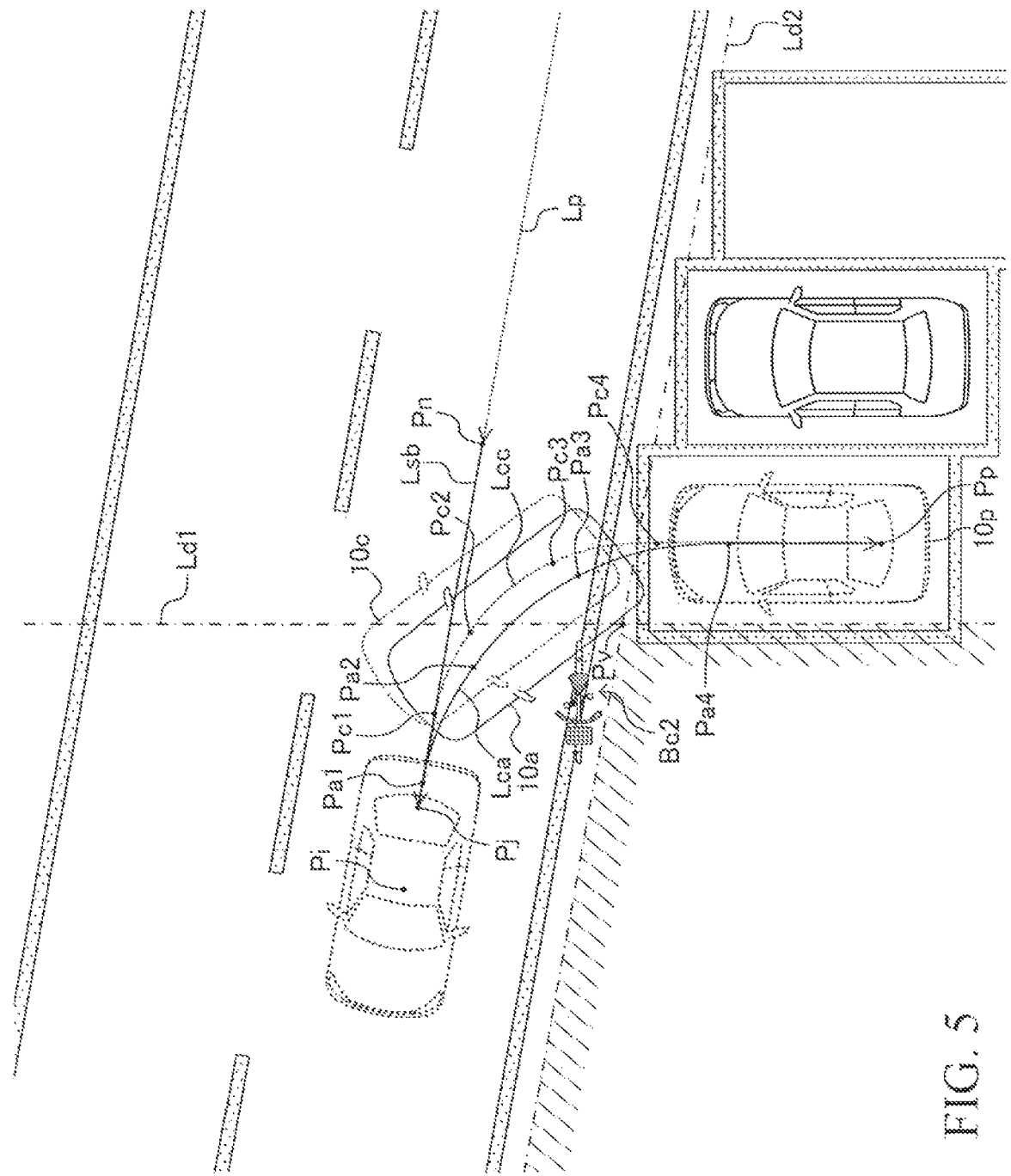
FIG. 5 is an example of the target travelling route in a case where an object is detected when the present vehicle is travelling along a forward section.

In the example shown in FIG. 5, a bicycle Bc2 is detected while the vehicle 10 moves along the forward section. Supposing that the vehicle 10 moves along the path represented by the curved line Lca which has been obtained as the backward section, the bicycle Bc2 will be detected as the obstacle and the collision avoiding processing will be executed. Namely, the bicycle Bc2 is the candidate obstacle.

In view of this, the drive assistance ECU 21 stops travelling (moving forward) of the vehicle 10 before the reference point Pr reaches (coincides with) the point Pi. In the present example, the actual forward section is a straight line Lsb from the point Pn to a point Pj. In addition, the drive assistance ECU 21 obtains a section (path, route) represented by a dashed line Lcc as the backward section that can avoid the collision between the vehicle 10 and the bicycle Bc2. As understood form FIG. 5, the dashed line Lcc includes (passes through) a point Pc1, a point Pc2, a point Pc3, and a point Pc4.

When the vehicle 10 moves from the point Pc1 to the point Pc2, the magnitude $|\theta s|$ of the steering angle $\theta s$ increases from "0." While the vehicle 10 moves from the point Pc2 to the point Pc3, the steering angle $\theta s$ does not change. While the vehicle 10 moves from the point Pc3 to the point Pc4, the magnitude $|\theta s|$ of the steering angle $\theta s$ decreases down to "0." As understood from FIG. 5, the route represented by the dashed line Lcc is not as gentle (smooth) as the one represented by the curved line Lca.

A vehicle position 10c indicates a position of the vehicle 10 at a point in time when the reference point Pr reaches the point Pc3 while the vehicle 10 moves along the route represented by the dashed line Lcc. As understood from FIG. 5, if the vehicle 10 moves along the route represented by the dashed line Lcc which is obtained as the backward section, the collision with the bicycle Bc2 will be avoided. Accordingly, in this case, the drive assistance ECU 21 obtains the route represented by the dashed line Lcc (instead of the route represented by the curved line Lca) as the backward section in order to avoid occurring the assist interruption although the route represented by the dashed line Lcc is not a relatively gentle (smooth) route.

Figure 6:
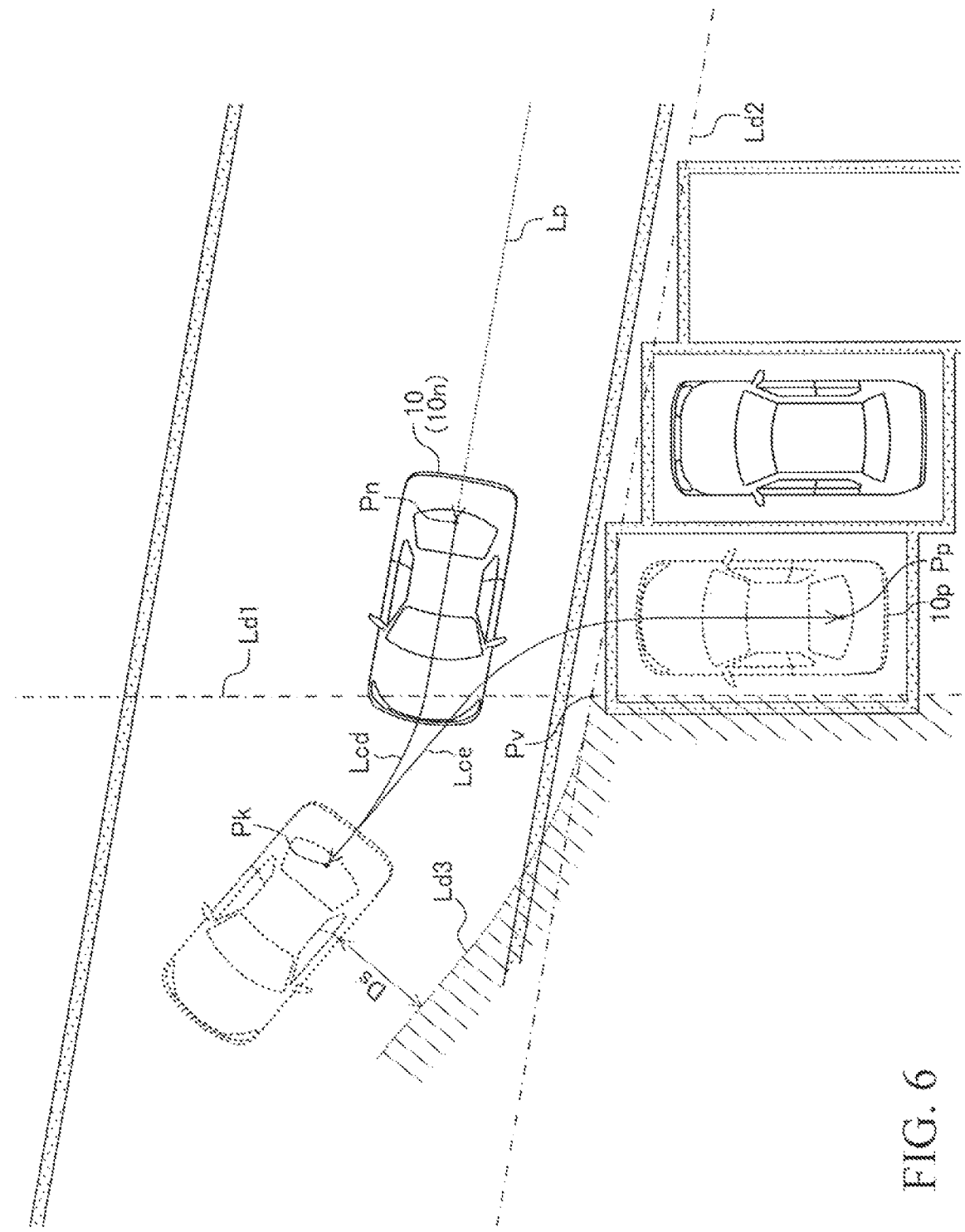
FIG. 6 is an example of the target travelling route in a case where the forward section is a curved line.

Next, processing for obtaining the backward section will be described more specifically. In the examples shown in FIG. 4 and FIG. 5 described above, the forward section obtained through the route obtaining processing is the straight line (namely, the straight line Ls). On the other hand, as shown in FIG. 6, there may be a case where the forward section is a curved line. In the example shown in FIG. 6, the forward section is represented by a curved line Lcd from the point Pn to a point Pk that is the reverse position, and the backward section is represented by a curved line Lce from the point Pk to the point Pp.

A dashed line Ld3 indicates a set of points which are on the specific direction side (namely, the left side) while the vehicle 10 moves along the forward section (namely, the curved line Lcd). In addition, a distance between the dashed line Ld3 (or each of the points on line Ld3) and the vehicle 10 that moves along the forward section (namely, the curved line Lcd). Accordingly, the specific region in this example is a region on the left side of the dash-dot-dash line Ld1 on the sheet of FIG. 6 and below the dashed line Ld3 on the sheet of FIG. 6.

Incidentally, as understood from FIG. 6, a yaw angle difference which is a magnitude of difference between the yaw angle of the vehicle 10 located at the present position (namely, the direction of the vehicle 10 at the present time) and the yaw angle of the vehicle 10 located at the target parking position (namely, the direction of the vehicle 10 parked at the target parking position) decreases, as the vehicle 10 moves along the forward section (namely, the curved line Lcd). In addition, the yaw angle difference decreases as the vehicle 10 moves along the backward section (namely, the curved line Lce). When the vehicle 10 reaches the target parking position, the yaw angle difference is "0."

Considering further the above described case where the forward section is a straight line together with the example shown in FIG. 6, it can be said that the drive assistance ECU 21 obtains the forward section such that the yaw angle difference does not increase (namely, the yaw angle difference decreases or does not change) while the vehicle 10 moves along that forward section. Similarly, it can be said that the drive assistance ECU 21 obtains the backward section such that the yaw angle difference does not increase while the vehicle 10 moves along that backward section.

In other words, the backward section (for example, each of the path/route/section represented by the curved line Lca, the dashed line Lcb, the dashed line Lcc, and the curved line Lce shown in FIG. 4 to 6) in a top view is a curved line which is curved in one direction (i.e., a curved line that does not have an inflection point). Similarly, the forward section (for example, each of the path/route/section represented by the straight line Ls, and the curved line Lcd shown in FIG. 4 to 6) in a top view is a straight line or a curved line which is curved in one direction that is the opposite direction with respect to the backward section.

Under this premise, the drive assistance ECU 21 obtains the backward section such that an "intersection distance" described below is larger than the clearance distance which is "0" in the present example while the vehicle 10 moves along that backward section. More specifically, the drive assistance ECU 21 obtains the backward section such that the minimum value of the intersection distance described below in a time period in which the vehicle 10 moves along/in the backward section is larger than "0." The intersection distance is a distance between the vehicle 10 (specifically, the vehicle body of the vehicle 10) and a point Pv (see FIG. 6) which is an intersection point of the specific line (in the present example, the dash-dot-dash line Ld1) and the reference line (in the present example, the dash-dot-dash line Ld2).

As a result, the vehicle 10 passes through a region on the vehicle position 10n side with respect to the point Pv and passes through a region on the vehicle position 10p side, while the vehicle 10 moves along the backward section. Since the backward section is obtained such that the intersection distance is larger than "0" while the vehicle 10 moves along the backward section, the vehicle 10 does not enter the specific region while the vehicle 10 moves along that backward section.

(Specific Operation)

Next, specific operation of the drive assistance ECU 21 regarding the parking assistance processing will be described. The CPU (hereinafter also referred to as "the CPU" for simplification) of the drive assistance ECU 21 executes a "parking assistance processing routine" represented by a flowchart shown in FIG. 7 every time a predetermined time elapses.

In the present routine, the CPU refers to and changes a value of a travelling assistance flag Xta. The CPU sets the value of the travelling assistance flag Xta to "0" in an initialization routine (not shown) which the CPU executes when the drive assistance ECU 21 is booted (turned on) (namely, a predetermined ignition-ON operation is performed by the driver). When the parking assistance processing is being executed, the value of the travelling assistance flag Xta is set to "1."

Figure 7:
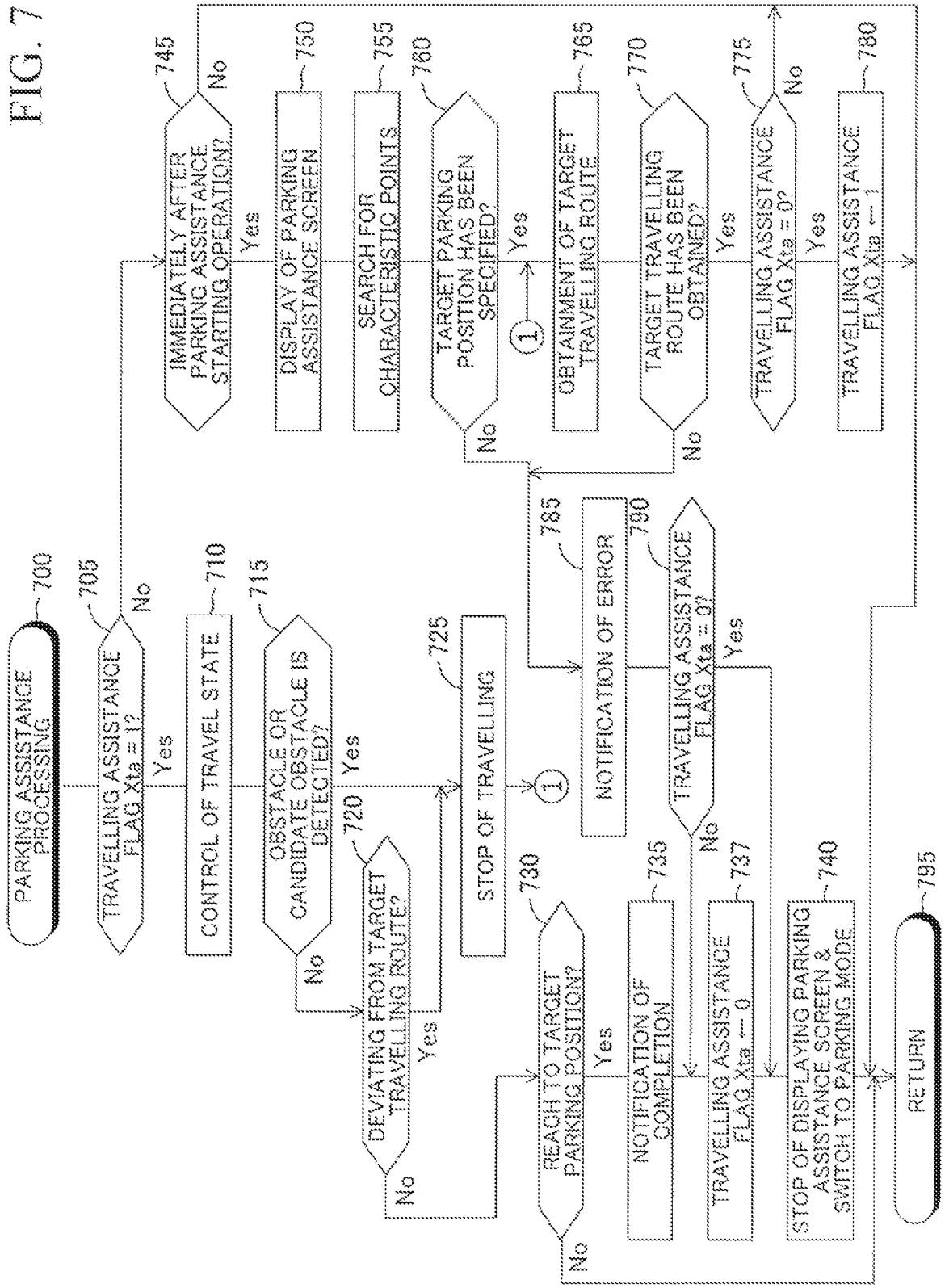
FIG. 7 is a flowchart representing a parking assistance processing routine executed by the present control apparatus.

When an appropriate timing has come, the CPU starts the process from step 700 of FIG. 7 and proceeds to step 705 so as to determine whether or not the value of the travelling assistance flag Xta is "1."

(Case A)

It is now assumed that the travelling assistance processing is not being executed (namely, neither the route obtaining processing nor the travelling assistance processing is being executed) and the parking assistance starting operation has not been performed.

According to the present assumption, the value of the travelling assistance flag Xta is "0," and thus, the CPU makes a "No" determination in step 705 and proceeds to step 745 so as to determine the present time point is immediately after the parking assistance starting operation was performed. Namely, the CPU determines whether or not the present routine is being executed for the first time after the parking assistance starting operation was performed.

According to the assumption described above, the parking assistance starting operation has not been performed, and thus, the CPU makes a "No" determination in step 745 and proceeds to step 795 so as to end the present routine.

(Case B)

It is assumed that the present routine is being executed for the first time after the parking assistance starting operation has been performed. In addition, it is assumed that the target parking position can be specified on the basis of the characteristic points contained in the surrounding image, the target travelling route can be obtained, the sonar object does not detected, and the vehicle 10 can reach the target parking position without departing from the target travelling route.

In this case, the CPU makes a "Yes" determination in step 745 and proceeds to step 750 so as to display the parking assistance screen Sa on the display 73. At this time, the CPU stores a screen that has been displayed on the display 73 immediately before the parking assistance screen Sa starts to be displayed into the RAM of the drive assistance ECU 21 as a "previous displayed screen."

Subsequently, the CPU proceeds to step 755 so as to search for the characteristic points. Namely, the CPU searches regions similar to the characteristic points contained in the surrounding image (specifically, the overhear image generated on the basis of the surrounding image). Furthermore, the CPU proceeds to step 760 so as to the determine whether or not the target parking position has been specified. Namely, the CPU determines whether or not a plurality of the characteristic points contained in the surrounding image have been detected and the target parking position with respect to the vehicle 10 that is positioned (located) at the present position has been specified on the basis of those characteristic points successfully.

According to the assumption described above, the target parking position can be specified on the basis of the characteristic points contained in the surrounding image, and thus, the CPU makes a "Yes" determination in step 760 and proceeds to step 765 so as to obtain the target travelling route.

Subsequently, the CPU proceeds to step 770 so as to determine whether or not the target travelling route has been obtained successfully. According to the assumption described above, the target travelling route can be obtained, and thus, the CPU makes a "Yes" determination in step 770 and proceeds to step 775 so as to determine whether or not the value of the travelling assistance flag Xta is "0."

According to the assumption described above, the travelling assistance processing has not been started, and thus, the value of the travelling assistance flag Xta is "0." Accordingly, in this case, the CPU makes a "Yes" determination in step 775 and proceeds to step 780 so as to set the value of the travelling assistance flag Xta to "1." Subsequently, the CPU proceeds to step 795 directly.

When the present routine is executed next time, the value of the travelling assistance flag Xta is "1." Therefore, the CPU makes a "Yes" determination in step 705 and proceeds to step 710 so as to control a travel state of the vehicle 10. Namely, the CPU sends, as necessary, the drive force control request, the shift change request, the brake force control request and the steering angle control request to the respective ECUs, each corresponding to each of the requests, to let the vehicle 10 move (travel) along the target travelling route.

As a result of executing the process of step 710, the vehicle speed Vt and the steering angle θs are controlled such that the vehicle 10 travels along the target travelling route. In addition, when the vehicle 10 approaches the reverse position, the vehicle speed Vt is decreased. In addition, when the vehicle 10 approaches the target parking position, the vehicle speed Vt is decreased. Furthermore, when the vehicle 10 reaches the reverse position, the shift mode of the vehicle 10 is switched. Additionally, when the vehicle 10 reaches the target parking position, the shift mode of the vehicle 10 is switched.

Subsequently, the CPU proceeds to step 715 so as to determine whether or not the obstacle or the candidate obstacle is detected. According to the assumption described above, neither the obstacle nor the candidate obstacle has been detected, and thus, the CPU makes a "No" determination in step 715 and proceeds to step 720 so as to determine whether or not the vehicle 10 has deviated from the target travelling route. Specifically, the CPU determines whether or not the difference (deviation distance) between the present position of the vehicle 10 and the target travelling route (in the vehicle width direction) has become large (or greater than a certain threshold distance), so that it is difficult for the vehicle 10 to return to the target travelling route.

According to the assumption described above, the vehicle 10 has not deviated from the target travelling route, and thus, the CPU makes a "No" determination in step 720 and proceeds to step 730 so as to determine whether or not the vehicle 10 has reached the target parking position. The present point in time is immediately after the travelling assistance processing was just started, and thus, the vehicle 10 has not reached the target parking position. Therefore, the CPU makes a "No" determination in step 730 and proceeds to step 795 directly.

Thereafter, when the vehicle 10 reaches the target parking position as a result of repeatedly executing the process of step 710 of the present routine, the CPU makes a "Yes" determination in step 730 and proceeds to step 735 so as to notify the driver of completion (of the parking assistance). Specifically, the CPU notifies the driver that the vehicle 10 has reached the target parking position through characters displayed on the display 73 and a voice message played by the speaker 74.

Subsequently, the CPU proceeds to step 737 so as to set the value of the travelling assistance flag Xta to "0." In addition, the CPU proceeds to step 740 so as to stop displaying the parking assistance screen Sa on the display 73 and to switch to the parking mode. Specifically, the CPU starts displaying the previous displayed screen on the display 73. Furthermore, the CPU sends, to the drive control ECU 22, the shift change request indicating that the target shift mode is the parking mode. Subsequently, the CPU proceed to step 795 directly.

Namely, in this case, the CPU finishes the parking assistance processing. Thereafter, when the driver wants to let the vehicle 10 move (or to drive the vehicle 10), he/she operates the shift lever to switch the shift mode to the forward mode or the reverse mode.

(Case C)

Meanwhile, it is assumed that the present routine is being executed for the first time after the parking assistance starting operation has been performed and a plurality of the characteristic points necessary for specifying the target parking position cannot be detected from the surrounding image.

In this case, the CPU makes a "No" determination in step 760 and proceeds to step 785 so as to notify the driver of an error. Specifically, the CPU notifies the driver that it is impossible to make (let) the vehicle 10 reach the target parking position by the travelling assistance processing through characters displayed on the display 73 and a voice message played by the speaker 74.

Subsequently, the CPU proceeds to step 790 so as to determine whether or not the value of the travelling assistance flag Xta is "0." According to the assumption described above, the travelling assistance processing has not been started yet, and thus, the value of the travelling assistance flag Xta is "0." Accordingly, the CPU makes a "Yes" determination in step 790 and proceeds to step 740. Namely, in this case, the CPU finishes the parking assistance processing without executing the travelling assistance processing.

(Case D)

Next, it is assumed that the obstacle is detected while the travelling assistance processing is being executed and the target travelling route cannot be newly obtained again at that time (i.e., the new different travelling route cannot be obtained).

In this case, the CPU makes a "Yes" determination in step 715 and proceeds to step 725 so as to stop (travelling of) the vehicle 10. Namely, the CPU executes the collision avoidance processing. Specifically, the CPU obtains (figures out) the target brake force Bftg such that a collision between the vehicle 10 and the detected obstacle is avoided, and sends the brake force control request including that target brake force Bftg to the brake control ECU 23.

Subsequently, the CPU proceeds to step 765 so as to obtain the target travelling route. Namely, the CPU tries to obtain the new target travelling route from the present position of the vehicle 10 that has stopped to avoid the collision to the target parking position. Thereafter, the CPU proceeds to step 770.

According to the assumption described above, the new target travelling route cannot be obtained, and thus, the CPU makes a "No" determination in step 770 and proceeds to step 785 so as to notify the driver of the error. Subsequently, the CPU proceeds to step 790. In this case, the value of the travelling assistance flag Xta has been changed to "1," and thus, the CPU makes a "No" determination in step 790 and proceeds to step 737.

Namely, in this case, even though the travelling assistance processing was once started, the parking assistance processing ends (is terminated) before the vehicle 10 reaches the target parking position.

(Case E)

Next, it is assumed that the vehicle 10 deviates excessively from the (original) target travelling route while the travelling assistance processing is being executed and the new target travelling route can be obtained when it is determined that the vehicle 10 deviates excessively from the original target travelling route.

In this case, the CPU makes a "Yes" determination in step 720 and proceeds to step 725 so as to stop (travelling of) the vehicle 10. In this case, since the reason why the vehicle 10 is stopped is not because of avoiding the collision between the vehicle 10 and an obstacle, the target brake force Bftg which is obtained in this process is smaller than that in the Case D described above.

Subsequently, the CPU proceeds to step 765 so as to obtain the (new and different) target travelling route from the present position of the vehicle 10 that has stopped due to the excessive deviation from the (original) target travelling route to the target parking position. Thereafter, the CPU proceeds to step 770.

According to the assumption described above, the CPU can obtain the new target travelling route, and thus, the CPU makes a "Yes" determination in step 770 and proceeds to step 775. In this case, the value of the travelling assistance flag Xta has been "1," and thus, the CPU makes a "No" determination in step 775 and proceeds to step 795 directly.

Namely, in this case, the vehicle 10 stops temporarily due to departing (excessive deviation) from the (original) target travelling route, and thereafter, the vehicle 10 starts travelling again along the newly obtained (new) target travelling route.

(Case F)

Next, it is assumed that the candidate obstacle has just been detected while the vehicle 10 is travelling along the forward section.

In this case, the CPU makes a "Yes" determination in step 715 and proceeds to step 725 so as to stop (travelling of) the vehicle 10. At this time, since the reason why the vehicle 10 is stopped is not because of avoiding the collision between the vehicle 10 and an obstacle, the target brake force Bftg is relatively small similar to the Case E described above.

Subsequently, the CPU proceeds to step 765 so as to obtain the (new) target travelling route that allows the vehicle 10 to avoid the collision between the vehicle 10 and the candidate obstacle while the vehicle 10 moves along the backward section (namely, the new travelling route).

Notably, if the parking assistance starting operation is performed when the target parking position is not stored (registered), the CPU executes an unillustrated routine for urging (prompting) the driver to register the target parking position.

As having been described above, according to the present assistance apparatus, it is possible to reduce the possibility that the assist interruption occurs, whereas the target travelling route is obtained such that that target travelling route is as gentle (smooth) as possible. In addition, according to the present assistance apparatus, the target travelling route can be obtained by executing a relatively simple process by taking into consideration the intersection distance which is obtained on the basis of the intersection point of the specific line and the reference line.

The embodiment of the parking assistance apparatus according to the present disclosure has been described; however, the present disclosure is not limited to the above-described embodiments, and various modifications are possible without departing from the scope of the disclosure. For example, in the present embodiment, the steering angle θs, the shift mode, the drive force, and the brake force are automatically controlled when the travelling assistance processing is executed. However, some or all of the shift mode, the drive force, and the brake force may be controlled by the driver when the travelling assistance processing is executed.

As an example, the shift mode may be controlled (switched) by the driver. In this case, when the vehicle 10 moves along the forward section and reaches the reverse position, the drive assistance ECU 21 may urge (prompt) the driver to operate the shift lever so as to switch the shift mode to the reverse mode through characters displayed on the display 73 and a voice message played by the speaker 74.

Alternatively, while the travelling assistance processing is executed, the driver may control the vehicle speed Vt by operating the accelerator pedal and/or the brake pedal (typically, brake pedal only). In this case, the drive assistance ECU 21 may be configured to control the steering angle θs automatically in response to a change in the vehicle speed Vt.

In addition, the drive assistance ECU 21 according to the present embodiment automatically start the travelling assistance processing when the target travelling route is obtained by the route obtaining processing which is executed at the start of the parking assistance processing. However, the drive assistance ECU 21 may start executing the travelling assistance processing when a predetermined operation is performed by the driver. For example, the drive assistance ECU 21 may be configured to display a start button on the display 73 when the target travelling route is obtained, and to start executing the travelling assistance processing when the driver performs a tapping operation to the start button (namely, when the driver touches the start button displayed on the display 73).

In addition, in the present embodiment, the driver can store (register), in the drive assistance ECU 21, one target parking position (namely, a set of the characteristic points) obtained by the parking position registering processing. However, the drive assistance ECU 21 may be configured so that the driver can register a plurality of the target parking positions (namely, multiple sets of the characteristic points).

In addition, the drive assistance ECU 21 according to the present embodiment assists the driver to park the vehicle 10 to the target parking position which has been registered by the parking position registering processing. However, the drive assistance ECU 21 may assist the driver to park the vehicle 10 to the target parking position which has not been registered in advance. For example, the drive assistance ECU 21 may be configured to extract (recognize) a road marking (as an example, a white lane marker indicating a parking section/lot) around the vehicle 10 when the parking assistance starting operation is performed, and to display, on the display 73, the parking section which is extracted as a candidate of the target parking position. In this case, if the displayed target parking position matches the driver's intended position, the driver makes (lets) the drive assistance ECU 21 continue the parking assistance processing by performing a predetermined operation.

In addition, in the present embodiment, the value of the clearance distance is "0." However, the value of the clearance distance may be different from "0" (namely, a value larger than "0"). For example, the clearance distance may be a value equal to the threshold distance Dt. In this case, the drive assistance ECU 21 obtains the backward section such that the minimum value of the distance between the vehicle 10 and the specific region while the vehicle 10 moves along that backward section is larger than the threshold distance Dt.

In addition, the examples of the target travelling routes described above include only the forward section and the backward section. Namely, each of those target travelling routes includes only one reverse position (shift mode switching position) at which the shift mode is switched between the forward mode and reverse mode. However, the drive assistance ECU 21 may obtain the target travelling route which includes a plurality of the shift mode switching positions. For instance, the target travelling route may further include one or more section(s) from the present position of the vehicle 10 to the start point of the forward section.

In addition, in the present embodiment, the object detection sensor devices are the left side sonar apparatus 60 and the right side sonar apparatus 65. However, the object detection sensor device may be different from those sonar apparatuses. For example, the object detection sensor device is a millimeter wave radar device which transmits a millimeter wave (electromagnetic wave) as the transmission wave.

Furthermore, the front camera 31, the rear camera 32, the left side camera 33, and the right side camera 34 may be utilized as the object detection sensor devices. In this case, the drive assistance ECU 21 obtains (estimates), on the basis of a position of the object in the surrounding image, a position (distance and direction) of that object with respect to the vehicle 10. Furthermore, a distance to the far end of a range within which the position of the object can be obtained relatively accurately may be regarded as the detection distance Ds.

In addition, the drive assistance ECU 21 according to the present embodiment determines that the sonar object is the object when the distance between that object and the vehicle 10 is smaller than the threshold distance Dt. Namely, the threshold distance for determining whether or not the sonar object is the obstacle is a fixed value regardless of the position of the object. However, the threshold distance for determining whether or not the sonar object is the obstacle may be set to different values depending on whether that object is in front of or behind the vehicle 10, or on the side of the vehicle 10.

In addition, a part of functions realized by the drive assistance ECU 21 according to the present embodiment may be realized by another ECU. Namely, those functions of the drive assistance ECU 21 are realized by a plurality of ECUs.

What is claimed is:

1. A parking assistance apparatus comprising:
   an object detection sensor device configured to detect an object that is present in a predetermined detection region with respect to a vehicle, said predetermined detection region including at least a part of a side area of said vehicle;
   a control unit implemented by at least one programmed processor and configured to:
      obtain a target travelling route from a first position of said vehicle that is a position of said vehicle when a parking assistance starting operation is performed to a target parking position;
      execute a travelling assistance processing for controlling at least a steering angle of said vehicle such that said vehicle moves along said target travelling route; and
      execute a predetermined collision avoidance processing when an object regarded as an obstacle is detected by said object detection sensor device while said travelling assistance processing is being executed, wherein a first distance between said object regarded as said obstacle and said vehicle is smaller than a predetermined threshold distance,
   wherein
   said control unit is configured to:
      obtain said target travelling route for a first time after said parking assistance starting operation is performed such that said target travelling route includes a backward section and a forward section, and a minimum value of a second distance between said vehicle and a specific region is larger than a predetermined clearance distance while said vehicle moves along said backward section, said backward section being a section along which said vehicle is made to move backward to reach said target parking position, said forward section being a section along which said vehicle is made to move forward to reach a reverse position that is a start point of said backward section, said specific region being a region on a specific direction side of a specific line with respect to said vehicle located at said target parking position and on said specific direction side of a sum set region with respect to said vehicle while said vehicle is moving along said forward section,
   and wherein,
      said specific direction is one of a right direction and a left direction and is a direction in which said target parking position is present with respect to said vehicle located at said first position;
      said specific line is a straight line which is parallel to a longitudinal direction of said vehicle located at said target parking position and is on said specific direction side with respect to said vehicle located at said target parking position, wherein a third distance between said specific line and said vehicle located at said target parking position is equal to said predetermined threshold distance; and
      said predetermined detection region is one of a plurality of predetermined detection regions, and said sum set region is a set of said predetermined detection regions, each being present on said specific direction side of said vehicle while the vehicle moves along said forward section.

2. The parking assistance apparatus according to claim 1, wherein
   said object detection sensor device is configured such that said predetermined detection region extends laterally from said vehicle to a position that is a predetermined detection distance laterally away from said vehicle; and
   said control unit is configured to obtain said target travelling route such that:
      a yaw angle differential does not increase while said vehicle moves along said forward section, said yaw angle differential does not increase while said vehicle moves along said backward section; and
      a minimum value of a fourth distance between said vehicle and an intersection point between said specific line and a reference line is larger than said predetermined clearance distance while said vehicle moves along said backward section,
   wherein
      said yaw angle differential is a magnitude of difference between a yaw angle of said vehicle and said yaw angle of said vehicle located at said target parking position; and
      said reference line is a straight line which is parallel to said longitudinal direction of said vehicle located at said first position and is on said specific direction side of said vehicle located at said first position, wherein a fifth distance between said reference line and said vehicle located at said first position is equal to said predetermined detection distance.

3. The parking assistance apparatus according to claim 1, wherein said object detection sensor device is mounted on a vehicle body of said vehicle and comprises:

a transmission section which transmits an electromagnetic wave or a sonic wave as a transmission wave to the side of said vehicle; and a reception section which receives a reflection wave generated by reflection of said transmission wave at said object present in said predetermined detection region.

* * * * *